United States Patent Office 3,433,623
Patented Mar. 18, 1969

3,433,623
PHOSPHORIC TRIAMIDE DERIVATIVES AS HERBICIDES
Horst O. Bayer, Levittown, and Victor H. Unger, Willow Grove, Pa., assignors to Rohm & Haas Company, Philadelphia, Pa., a corporation of Delaware
No Drawing. Filed Oct. 20, 1965, Ser. No. 499,058
U.S. Cl. 71—86                         3 Claims
Int. Cl. A01n 9/36, 5/00

ABSTRACT OF THE DISCLOSURE

Phosphoric triamide derivatives of the formula

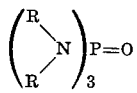

wherein the R's represent alkyl and alkenyl of 2 to 6 carbon atoms are useful for controlling weeds and particularly useful for the postemergence control of a variety of monocotyledonous and dicotyledonous weeds.

---

This invention is concerned with derivatives of phosphoric triamide, $(NH_2)_3P=O$, which exhibit outstanding herbicidal properties. In particular the invention deals with herbicidal compositions containing these phosphoric triamide derivatives and with a method of controlling weeds with them.

The active compounds of this inventory may be represented by the formula

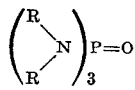

wherein R is alkyl of 2 to 6 carbon atoms, alkenyl of 2 to 6 carbon atoms and when the two R's are taken together with the N atom they may be pyrrolidinyl or piperidinyl. Representative compounds of this invention are:

Hexaethylphosphoric triamide
Hexapropylphosphoric triamide
Hexabutylphosphoric triamide
Hexaisobutylphosphoric triamide
Hexapentylphosphoric triamide
Hexasecamylphosphoric triamide
Hexahexylphosphoric triamide
Hexavinylphosphoric triamide
Hexaallylphosphoric triamide
Hexa-2-butenylphosphoric triamide
Hexa-3-pentenylphosphoric triamide
Hexa-4-hexenylphosphoric triamide
Tris(tetramethylene)phosphoric triamide
Tris(pentamethylene)phosphoric triamide The phosphoric triamides of this invention may be made by several procedures, such as (a) Reaction of phosphorus oxychloride or oxybromide with the appropriate secondary amine, usually with at least six molar equivalents (1)    $POCl_3 + 6R_2NH \rightarrow (R_2N)_3PO + 3R_2NH \cdot HCl$ The reaction proceeds at moderate temperatures, usually in the range from 15° C. to 200° C. The use of an inert solvent is preferred but is not absolutely necessary. Solvents of the hydrocarbon and ether types are preferred. Hydrogen halide acceptors other than the secondary amine reactant such as aqueous sodium hydroxide or ammonia have been used. In many instances there is a stepwise replacement of the Cl's in $POCl_3$ so that the first Cl is replaced with the $R_2N$— group more readily than the second which in turn is more readily replaced than the third.

(b) Oxidation of phosphorous triamides (2)    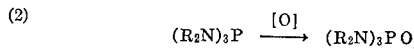

The phosphorous triamides may be obtained by reaction of phosphorus trichloride with secondary amines. Oxidizing agents such as the halogens and hydrogen peroxide may be used.

(c) Reaction of phosphorus pentachloride with the appropriate secondary amine followed by hydrolysis (3)    $PCl_5 + 6R_2NH \rightarrow Cl(R_2N)_3P^+ \cdot Cl^- + 3R_2NH \cdot HCl$ $Cl(R_2N)_3P^+ \cdot Cl^- + H_2O \rightarrow (R_3N)_3PO + 2HCl$ The $Cl(R_2N)_3P^+ \cdot Cl^-$, which may generally be termed as chlorophosphonium chlorides, are readily hydrolyzed to the phosphoric triamides by brief warming with aqueous alkaline solutions. In some instances hydrolysis occurs with just water.

The following illustrate typical preparative methods.

PREPARATIONS OF PHOSPHORIC TRIAMIDES, $(R_2N)_3P=O$

A. Method of Reaction 1.—Preparation of tris(tetramethylene)phosphoric triamide $(CH_2CH_2CH_2CH_2N)_3PO$ To a solution of 150 g. (2.11 moles) of pyrrolidine in 300 ml. of dry benzene was added dropwise 54 g. (0.35 mole) of phosphorus oxychloride with the reaction temperature being maintained at 15–20° C. After standing at room temperature overnight the mixture was refluxed for 6 hours, cooled and filtered to remove 85 g. of pyrrolidine hydrochloride. The filtrate was extracted several times with 50 ml. portions of 50% sodium hydroxide solution then concentrated by means of a rotary evaporator. The dark residue was distilled to give 41 g. of main fraction distilling in the range of 148° to 150° C. at 0.55 mm. (Hg) pressure. The product was a slightly yellow oil. Vapor phase chromatography on a silicon rubber-chromosorb W column operated at 220° C. indicated a single component. The product is a 46% yield of tris-(tetramethylene)phosphoric triamide.

B. Method of Reaction 2.—Preparation of hexaethylphosphoric triamide, $(Et_2N)_3PO$ To a solution of 12.0 g. (0.048 mole) of hexaethylphosphorous triamide in 100 ml. of benzene was added 20 ml. of water. The mixture was stirred and 4 ml. of 30% hydrogen peroxide was added dropwise. No effort was made to cool the exothermic reaction. An additional 15 ml. of 30% hydrogen peroxide was added in three separate portions and the mixture stirred for an additional hour. The aqueous phase was separated. The organic layer was extracted three times with 25 ml. portions of water, was dried over anhydrous sodium sulfate, and the solvent was removed in a rotary evaporator at reduced pressure. The residue was 12.5 g. of a faintly yellow oil. Except for a trace of residual solvent the product was homogeneous as shown by vapor phase chromatography on a silicon rubber-chromosorb W column at 230° C. The product is an essentially quantitative yield of hexaethylphosphoric triamide.

C. Method of Reaction 3.—Preparation of hexaoctylphosphoric triamide, $(octyl_2N)_3PO$ To a solution of 23 g. (0.096 mole) of n-octylamine in 100 ml. of dry benzene was added 3.3 g. (0.016 mole) of phosphorus pentachloride. After stirring at room temperature for 1 hour the mixture was refluxed overnight. The reaction mixture was cooled, octylamine hydrochloride removed by filtration and the benzene filtrate concentrated to give 13 g. of crude tris(dioctylamido)chlorophosphonium chloride $[(C_8H_{17})_2N]_3PCl_2$. This residue was dissolved in 100 ml. of methanol, 12.7 g. (0.13 mole) of potassium carbonate added, and the mixture heated 1 hour at 65 C. The product was filtered and the filtrate concentrated to give an oil which was redissolved in ether extracted with 50 ml. of 5% hydrochloric acid and with a brine solution then concentrated to give 8.8 g. of brown oil. This oil was taken up in hexane and subjected to column chromatography on neutral alumina. The column was then successively eluted with hexane, hexane-benzene, ether and ether-methanol. Concentration of the ether-methanol eluate gave essentially pure hexaoctylphosphoric triamide as an amber oil.

The following Table I lists typical preparations of phosphoric triamides.

Emulsion concentrate formulations may be made by dissolving the compounds of this invention in an agronomically acceptable organic solvent and adding a solvent-soluble emulsifying agent. Suitable solvents are usually water-immiscible and may be found in the hydrocarbon, chlorinated hydrocarbon, ketone, ester, alcohol and amide classes of organic solvent. Useful solvents include toluene, xylene, naphthas, perchloroethylene, cyclohexanone, isophorone and dimethylformamide or mixtures thereof. The preferred solvents are in the aromatic hydrocarbon and ketone classes. Mixtures of solvents are commonly employed. The surfactants useful as emulsifying agents may constitute about 0.5 to 10% by weight of the emulsion concentrate and may be anionic, cationic or nonionic in character. Non-ionic surfactants are preferred. Anionic surfactants includes alcohol sulfates or sulfonates, alkylarene sulfonates or sulfosuccinates, such as calcium dodecyl-

TABLE I

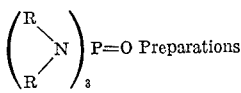 P=O Preparations

| Preparation No. | R= | Procedure of reaction | Physical constants | Empirical formula | Analysis | | Percent Calcd. |
|---|---|---|---|---|---|---|---|
| | | | | | Element | Percent Found | |
| 1 | $CH_3$ | | Commercially available | | N | 15.57 | 15.96 |
| | | | | | P | 11.60 | 11.97 |
| 2 | $C_2H_5$ | 2 | $n_D^{25}$ 1.4608 | $C_{12}H_{30}N_3OP$ | N | 12.13 | 12.09 |
| | | | | | P | 8.97 | 8.92 |
| 3 | $C_3H_7$ | 2 and 3 | $n_D^{25}$ 1.4592 B.P. 139–41° C/0.15 mm | $C_{18}H_{42}N_3OP$ | N | 9.64 | 9.74 |
| | | | | | P | 7.11 | 7.18 |
| 4 | $C_4H_9$ | 2 | $n_D^{25}$ 1.4594 | $C_{24}H_{54}N_3OP$ | N | 5.41 | 5.47 |
| | | | | | P | 4.33 | 4.02 |
| 5 | $C_8H_{17}$ | 3 | Oil | $C_{48}H_{102}N_3OP$ | N | 12.39 | 12.52 |
| | | | | | P | 9.07 | 9.23 |
| 6 | Allyl | 2 and 3 | M.P. 33–35° C | $C_{18}H_{30}N_3OP$ | N | | |
| | The 2 R's together= | | | | | | |
| 7 | $-(CH_2)_4-$ | 1 | $n_D^{25}$ 1.5068 | $C_{12}H_{24}N_3OP$ | N | 15.84 | 16.33 |
| | | | | | P | 12.15 | 12.04 |
| 8 | $-(CH_2)_5-$ | 2 and 3 | M.P. 38–40° C | $C_{15}H_{30}N_3OP$ | N | 14.09 | 14.03 |
| | | | | | P | 10.55 | 10.34 |

The compounds of this invention are useful in plant growth regulation. They find particular utility as herbicides and exhibit excellent postemergence activity on a variety of monocotyledonous and dicotyledonous weeds.

For use as herbicides these phosphoric triamides should be applied in an amount sufficient to exert the desired herbicidal action. For practical purposes this is in the range of 0.5 to 20 lb./a. of the active ingredient, usually 0.5 to 10 lb./a. and preferably 1 to 6 lb./a.

For the practical use of the phosphoric triamides of this invention as herbicides, it is desirable to formulate them and subsequently to extend them for application. They may be formulated in a liquid form, such as in an emulsion concentrate, or in a solid preparation, such as a wettable powder, dust or granular formulation by the use of an agronomically acceptable carrier. By agronomically acceptable carrier is meant any substance which can be used to dissolve, disperse or diffuse the chemical which is contained therein without impairing the effectiveness of the toxic agent and which does not do any permanent damage to such environment as soil, equipment and agronomic crops. For ultimate use, emulsion concentrates and wettable powders are extended with water and dusts and granular formulations may be extended with inert solid carriers. The extended materials may be applied to an area to be protected from weeds as either pre- or post-emergence herbicides in any manner desired as in an air stream or in an aqueous spray or with a granular applicator. Extended solid formulations containing 1 to 20% of the toxicants or liquid sprays containing 0.1 to 10% may be conveniently used. The choice of concentration and rate of application in any given situation will depend on several factors, such as the state of growth of the vegetation present, the type of herbicidal composition used and the method of application.

benzene-sulfonate or sodium dioctyl sulfosuccinate. Cationic surfactants include fatty acid alkyl amine salts and fatty acid alkyl quaternaries, such as laurylamine hydrochloride or lauryldimethylbenzylammonium chloride. Nonionic emulsifying agents which may be used include ethylene oxide adducts of alkylphenols, fatty alcohols, mercaptans or fatty acids, such as polyethylene glycol esters of stearic acid or polyethylene glycol ethers of palmityl alcohol or of octylphenol having from about 7 to 100 ether groups. The concentration of the active ingredients may vary from 10 to 80%, but is preferably in the range of 25 to 50%.

A typical example of an emulsion concentrate is:

EXAMPLE 1

A blend is made of the following materials:

| | Parts by wt. |
|---|---|
| Hexapropylphosphoric triamide | 25 |
| Isooctylphenoxypolyethoxyethanol | 10 |
| Dimethylformamide | 65 |

Wettable powder formulations are made by incorporating the phosphoric triamides in an inert, finely divided solid carrier and a surfactant which may be one or more emulsifying, wetting, dispersing or spreading agents or blends of these. The compounds are usually present in the range of 10 to 80% by weight and the surfactants in from 0.5 to 10% by weight. Solid carriers commonly used for blending with these compounds may be found in the classes of naturally occurring clays, silicates and silicas, limes and carbonates and of organic carriers. Typical of these are kaolin, fuller's earth, talc, diatomaceous earth, magnesium lime, dolomite, walnut shell flour, tobacco dust and sawdust. Commonly used emulsifying and wetting agents include polyoxyethylated alkylphenols, fatty alcohols, fatty acids and alkylamines, alkylarene sulfonates and dialkyl sulfosuccinates; spreading agents include such materials as glycerol mannitan laurate and a condensate of polyglycerol and oleic acid modified with phthalic anhydride; and dispersing agents include such materials as the sodium salt of the copolymer of maleic anhydride and an olefin, such as diisobutylene, sodium lignin sulfonate and sodium formaldehyde-naphthalene sulfonates.

A typical example of a wettable powder is:

EXAMPLE 2

A blend is made of the following materials:

| | Parts by wt. |
|---|---|
| Hexaallylphosphoric triamide | 50 |
| Agricultural grade of a diatomaceous earth | 45 |
| A solid surfactant containing 40% by weight of octyl phenoxypolyethoxyethanol having 10 ether units and 60% by weight of magnesium carbonate | 5 |

The product is then further blended in a micropulverizer.

Solid compositions in the form of dusts are made by mixing the compounds of this invention with inert carriers conventionally employed for the manufacture of pesticidal dusts for agricultural use, such as talcs, finely particled clays, pyrophyllite, diatomaceous earth, magnesium carbonate or flours, such as soyabean, wood, wheat, cottonseed and walnut shell. Dust concentrates in which the compounds are present in the range of 20 to 80% are commonly made and these are subsequently extended with additional solid to about 1 to 20% for ultimate application as herbicides.

A typical example of a dust concentrate is:

EXAMPLE 3

The following are introduced into a mixing vessel and thoroughly mixed.

| | Parts by wt. |
|---|---|
| Hexaethylphosphoric triamide | 40 |
| Dusting talc | 60 |

Granular formulations are made by incorporating the phosphoric triamides of this invention into granular or pelletized forms of agronomically acceptable carriers, such as granular clays, vermiculite, charcoal, ground corn cobs or bran in a range of sizes from 8 to 60 mesh (United States Standard Sieve Series sizes). Such granular formulations may be made to contain the phosphoric triamide derivatives in from 1 to 50% by weight.

A typical example of a granular formulation was made as follows:

EXAMPLE 4

| | Parts by wt. |
|---|---|
| Hexabutylphosphoric triamide | 10 |
| This was dissolved in the minimum amount of acetone and the solution added to vermiculite (30–60 mesh size) | 90 |

The product was thoroughly blended in a mixer using a stream of nitrogen as the acetone was evaporated off.

A standard greenhouse procedure for comparing the herbicidal activity of compounds was one method used for the evaluation of the compounds examined for this invention. This method comprises planting crop and weed seeds in soil in flats, allowing the seeds to germinate and the seedlings to develop and treating the resulting plants with an aqueous spray of the test compound about 2 weeks after the seeds are planted. The sprays are applied at a standard carrier rate of about 50 gallons per acre and the concentration is varied to give desired dosages, such as from 1 to 10 lb./a. About 2 weeks after application of the herbicidal agents, the state of growth and the phytotoxic effects are evaluated. This type of test constitutes a postemergence one; a similar test wherein the test compounds are applied to the soil immediately after the seeds are planted is a preemergence test.

Monocotyledonous species (abbreviated "mono" in Tables II and III) used in these studies included crabgrass (*Digitaria sanguinalis*), millet (*Setaria italica*), wild oats (*Avena fatua*), orchard grass (*Dactylis glomerata*), ryegrass (*Lolium multiflorum*), Sudan grass (*Sorghum sudanensis*) and wheat (*Triticum vulgare*).

Dicotyledonous species (abbreviated "di" in Tables II and III) used, included chickweed (*Stellaria media*), curly dock (*Rumex crispus*), flax (*Linum usitatissimum*), velvetleaf (*Abutilon theophrasti*), lamb's quarters (*Chenopodium album*), mustard (*Brassica kaber*), pigweed (*Amaranthus* spp.) sorrel (*Rumex* spp.) and wild carrot (*Daucus carota*).

Results are recorded in Table II for the average percent kill of all plants involved when the compounds were applied at a dosage of 10 pounds per acre and in Table III at 3 pounds per acre.

TABLE II.—HERBICIDAL DATA (10 LBS./A)

| Preparation No. (see Table I) | Average Percent kill | | | |
|---|---|---|---|---|
| | Postemergence | | Preemergence | |
| | Mono | Di | Mono | Di |
| 1 | 20 | 10 | 0 | 0 |
| 2 | 95 | 72 | 20 | 15 |
| 3 | 100 | 90 | 10 | 30 |
| 4 | 100 | 95 | 0 | 0 |
| 5 | 75 | 80 | 0 | 0 |
| 6 | 100 | 85 | 10 | 50 |
| 7 | 20 | 35 | 0 | 0 |
| 8 | 90 | 85 | 35 | 0 |

TABLE III.—HERBICIDAL DATA (3 LBS./A)

| Preparation No. (see Table I) | Average percent kill | | | |
|---|---|---|---|---|
| | Postemergence | | Preemergence | |
| | Mono | Di | Mono | Di |
| 1 | 0 | 0 | 0 | 0 |
| 2 | 52 | 76 | 0 | 2 |
| 3 | 83 | 92 | 15 | 24 |
| 4 | 76 | 90 | 0 | 0 |
| 5 | 0 | 0 | 0 | 0 |
| 6 | 64 | 96 | 0 | 0 |
| 7 | 9 | 38 | 0 | 0 |
| 8 | 57 | 74 | 0 | 0 |

The data in Tables II and III demonstrate outstanding postemergence activity for the compounds of this invention. In the hexaalkylphosphoric triamide series there is essentially no herbicidal activity for hexamethylphosphoric triamide (Preparation 1) and no activity for hexaoctylphosphoric triamide (Preparation 5) at the 3 pound per acre level. In this series the peak of activity occurs when the size of the alkyl group is in the three to four carbon range, i.e., propyl or butyl.

The activity of the phosphoric triamide derivatives of this invention can be enhanced by the use of high levels of surfactants. Surfactants effective for this purpose include (1) the nonionics, particularly the ethylene oxide adducts of alkylphenols wherein the alkyl group has a carbon content in the range of six to eighteen carbon atoms and the number of ether groups is from 5 to 50 units, and the dodecyl ether of polyethylene glycol, and (2) the dialkyl sodium sulfosuccinates wherein the alkyl groups have a carbon content of from six to eighteen carbon atoms.

The amount of surfactant (based on 100% active ingredient) to add to the phosphoric triamide derivatives to produce improved herbicidal performance is from one-fourth to eight times the weight of these herbicidal compounds. The surfactants may be added in a formulation or to the spray mixture, for example in the spray tank, that is to be applied to the area for which weed control is desired.

The increase in herbicidal activity due to the presence of surfactants was demonstrated in a field test wherein the herbicidal compound evaluated was Preparation No. 3—hexapropylphosphoric triamide and the surfactants used were:

Surfactant A—tert-octylphenoxypolyethoxyethanol
Surfactant B—n-$C_7$-$C_9$-alkylphenoxypolyethoxyethanol
Surfactant C—dodecyl ether of polyethylene glycol
Surfactant D—dioctyl sodium sulfosuccinate For the test, corn (Zea maize) and millet (Setaria italica) were planted and the crops and weeds allowed to grow for 29 days. At that time the corn was 12 to 18 inches high and the millet 8 to 10 inches high. The major weeds present were crabgrass (Digitaria sanguinalis), pigweed (Amaranthus spp.), purslane (Portulaca oleracea) and ragweed (Ambrosia spp.). Blanket postemergence treatments were then made with the phosphoric triamide derivatives alone and in combination with the surfactants. The treatments were applied as aqueous sprays at a rate of 50 gallons per acre. Crop injury and weed evaluations were made 11, 20 and 29 days after treatment. The results are given in Table IV (monocots refer to monocotyledonous weeds, and dicots to dicotyledonous weeds), for surfactant A (Surf. A) which are typical of results with the other surfactants.

TABLE IV.—HERBICIDAL ACTIVITY WITH AND WITHOUT SURFACTANTS

[Percent injury, days after treatment]

| Treatments | Lb. active per acre | Corn | | | Millet | | | Monocots | | | Dicots | | |
|---|---|---|---|---|---|---|---|---|---|---|---|---|---|
| | | 11 | 20 | 29 | 11 | 20 | 29 | 11 | 20 | 29 | 11 | 20 | 29 |
| Prep. No. 3 | 1 | 30 | 15 | 13 | 17 | 0 | 7 | 27 | 0 | 0 | 24 | 20 | 7 |
| Prep. No. 3 | 4 | 57 | 35 | 23 | 60 | 35 | 27 | 75 | 50 | 45 | 70 | 57 | 73 |
| Prep. No. 3+Surf. A | 1+0.25 | 47 | 35 | 27 | 50 | 20 | 17 | 68 | 30 | 55 | 58 | 60 | 59 |
| Prep. No. 3+Surf. A | 1+2 | 63 | 60 | 37 | 60 | 50 | 30 | 65 | 10 | 37 | 67 | 65 | 67 |
| Prep. No. 3+Surf. A | 1+4 | 85 | 85 | 77 | 83 | 70 | 73 | 72 | 30 | 50 | 72 | 60 | 63 |
| Prep. No. 3+Surf. A | 1+8 | 83 | 80 | 60 | 77 | 55 | 50 | 65 | 30 | 43 | 65 | 45 | 60 |

Corn and millet are crop plants, but in this case represent a reliable measure of herbicidal activity. It will be seen from Table IV that considerable enhancement of activity with Preparation 3 is achieved when as little as one-fourth pound of the surfactant is used with one pound of the chemical. When 2 to 8 pounds of the surfactant are used with one pound of the chemical, herbicidal activity comparable to that of 4 pounds of the chemical alone is achieved.

The phosphoric triamide derivatives of this invention are also useful for the desiccation of crop plants and as plant defoliants. Field tests conducted with formulations of Preparation 3 gave excellent results for potato vine killing at 3 and 6 pounds of the active ingredients per acre and compared favorably with sodium arsenite at 8 pounds per acre. Preparation No. 3 has given promising results in cotton defoliation field tests.

We claim:

1. A method for controlling undesirable plants by applying to the area to be protected from growth of undesirable plants in a herbicidal amount, a herbicidal composition containing as the active ingredient a phosphoric triamide derivative of the formula

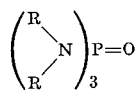

wherein R is alkyl of 2 to 6 carbon atoms or alkenyl of 2 to 6 carbon atoms.

2. A method of controlling undesirable plants according to claim 1 wherein said phosphoric triamide derivative is applied to said area in the amount of one-half to twenty pounds per acre.

3. A method of controlling undesirable plants according to claim 1 wherein said active ingredient is hexapropylphosphoric triamide.

References Cited

UNITED STATES PATENTS

| 3,317,637 | 5/1967 | Brust | 260—959 |
| 3,337,656 | 8/1967 | Curtis et al. | 260—959 |
| 2,146,584 | 2/1939 | Lipkin | 260—959 |
| 2,160,842 | 6/1939 | Dreyfus | 260—959 |
| 2,993,775 | 7/1961 | Baker | 71—71 |
| 3,111,526 | 11/1963 | Koopmans et al. | 71—86 |
| 3,156,552 | 11/1964 | Josephs | 71—86 |
| 3,321,516 | 5/1967 | Popoff | 260—959 |

OTHER REFERENCES

Truhaut et al.: "Use of Plant Cell as Test Object for the Control of Cancer by Application of Radiomimetics" (1958), C.A. 54, p. 5936 (1960).

LEWIS GOTTS, Primary Examiner.

G. HOLLRAH, Assistant Examiner.

U.S. Cl. X.R.

71—71